Patented Sept. 3, 1929.

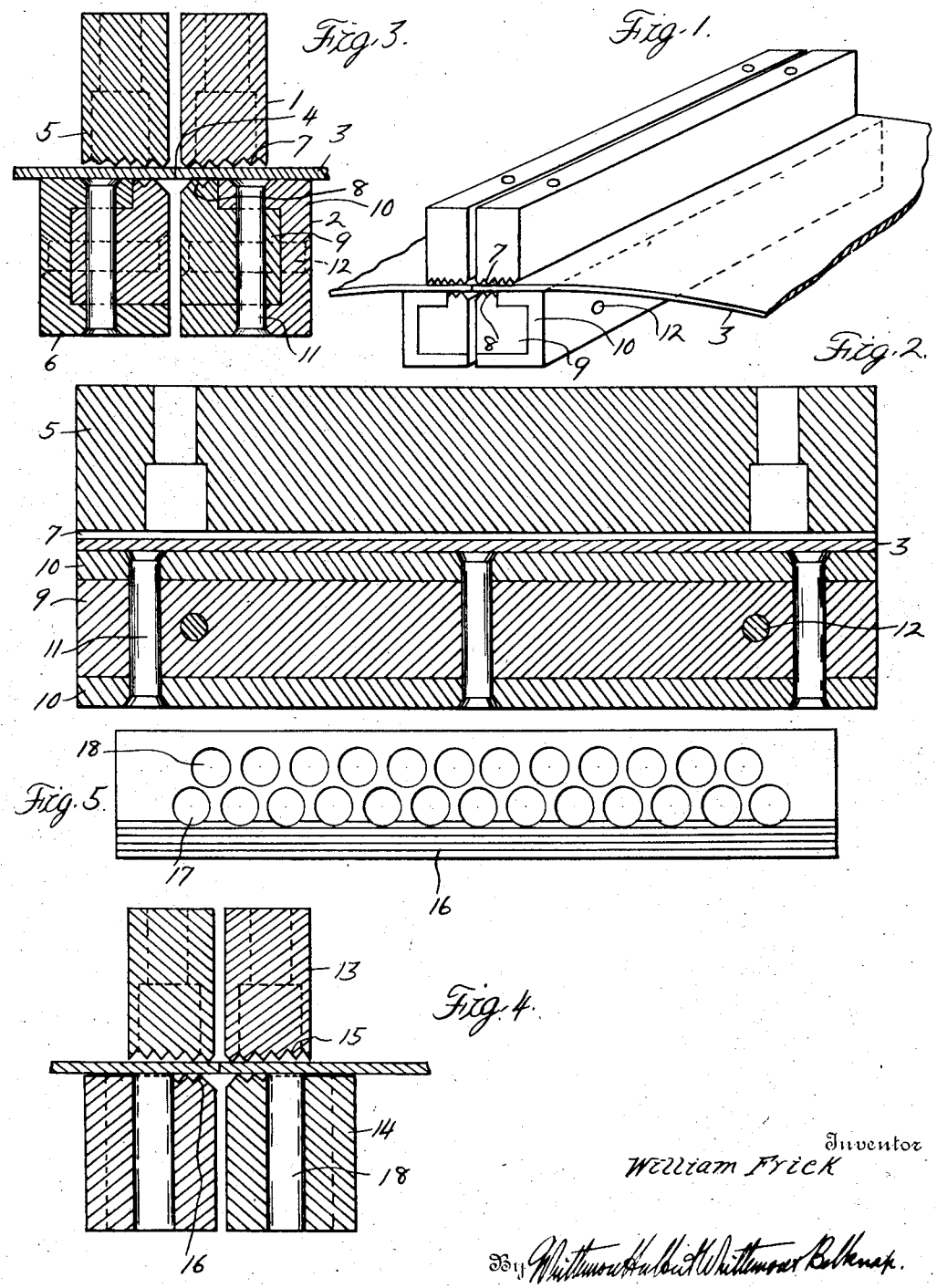

1,727,166

UNITED STATES PATENT OFFICE.

WILLIAM FRICK, OF DETROIT, MICHIGAN, ASSIGNOR TO KELSEY-HAYES WHEEL CORPORATION, OF DETROIT, MICHIGAN, A CORPORATION OF NEW YORK.

WELDING APPARATUS.

Application filed April 27, 1925. Serial No. 26,224.

The invention relates to welding apparatus and has for one of its objects the provision of a jaw engageable with the work and having provision for effecting good electrical contact with the work substantially co-extensive with the portion of the work to be welded whereby a uniform weld may be secured. Another object is to provide a jaw having a hardened tooth substantially co-extensive with the portion of the work to be welded for penetrating the work and also having provision for conducting electric current thereto. With these as well as other objects in view the invention resides in the novel features of construction and combinations and arrangements of parts as more fully hereinafter set forth.

In the drawings:—

Figure 1 is a perspective view of a welding apparatus embodying my invention;

Figures 2 and 3 are sections therethrough at right angles to each other;

Figure 4 is a transverse section through a modified welding apparatus;

Figure 5 is a plan view of one of the jaws thereof.

The welding apparatus embodying my invention is designed particularly for use in butt welding and as shown in the present instance the work operated upon is a cylindrical metallic blank formed by hooping a flat metallic sheet to bring its ends adjacent to each other.

1 and 2 are respectively the upper and lower cooperating jaws engageable with opposite sides of the cylindrical metallic blank 3 at one end thereof and adjacent to its split 4. 5 and 6 are respectively the upper and lower cooperating jaws engageable with opposite sides of the blank 3 at the other end thereof and adjacent to the split. These jaws are secured on a welding machine in the usual manner so that the upper jaws may be moved downwardly toward the lower jaws to clamp the work and then the pairs of jaws, each comprising an upper and a lower jaw, may be moved relatively toward each other to take care of the metal used up in sparking or heating as well as in upsetting the ends which are being welded together.

In order to make a good weld throughout the width of the work the jaws are provided with cooperating corrugated faces which are engageable with the work. In detail, each upper jaw is provided with a lower corrugated face formed of the series of parallel teeth 7. Each lower jaw has a corrugated upper face formed of the plurality of teeth 8 which alternate with the teeth of the corresponding upper jaw or are arranged in staggered relation thereto. These corrugated faces have a length sufficient to extend over the complete width of the stock. Also the corrugated face of each upper jaw preferably recedes slightly away from the work from its inner to its outer tooth so that when lowering the upper jaw the tooth thereof and the tooth of the corresponding lower jaw nearest the split will penetrate the work to a greater extent than the other teeth.

Each upper jaw is preferably formed of hardened and ground steel and the teeth of each lower jaw are formed upon and integral with the section 9 of hardened and ground steel so that the teeth will penetrate any foreign matter such as scale and the like on the surface of the stock and provide a good contact with the stock. Furthermore if the thickness of the stock varies across its width the teeth will penetrate the stock a sufficient distance so that they will have good contact with the stock throughout its whole width.

Each lower jaw has provision for conducting electric current to or from the work to effect the welding of the split in the usual manner. As shown, each lower jaw has the holder section 10 which is preferably formed of copper and embraces the hardened section 9 with one leg above a portion of the section and having an upper face substantially flush with the apices of the teeth 8 and terminating adjacent thereto. The other leg of this holder is preferably of greater length and extends below the section. The holder 10 is firmly secured to the section 9 by means of the vertical rivets 11 extending through the legs of the holder and the hardened section and also by means of the horizontal rivets 12 extending through the upright portion of the holder and the hardened section, the heads of these rivets preferably extending flush with the surfaces of the jaw.

With the above arrangement it will be seen that the teeth of the jaws will penetrate through any foreign matter upon the work and into the work, or in the event that the work is of varying thickness across its width penetrate into the work, to provide a good contact throughout the width of the work so that the electric current will heat the work uniformly throughout its full width, thereby making a uniformly strong weld between its ends.

With the modified apparatus shown in Figures 4 and 5 the general arrangement of the jaws is the same as that shown in Figures 1, 2 and 3 with the exception that different means is provided for conducting electric current to the work. In detail 13 are the upper jaws and 14 the lower jaws, each of the former having a lower corrugated face formed of the series of teeth 15 and each of the latter having an upper corrugated face formed of the plurality of teeth 16. The teeth of the upper and lower jaws alternate and the teeth of the upper jaws adjacent to the split in the work are arranged to contact with the work prior to the other teeth. Each lower jaw is provided with the rows 17 and 18 of pins preferably formed of copper which extend vertically through the lower jaw and are arranged in staggered relation with the innermost row of pins adjacent to the corrugated face. With this arrangement flow of the electric current is secured uniformly throughout the width of the work.

What I claim as my invention is:

1. In welding apparatus, the combination of adjacent pairs of cooperating jaws engageable with adjacent ends of the work, the jaws of each pair being on opposite sides of the work, the jaws at one side having hardened corrugations and the jaws at the other side each comprising a section having a hardened corrugation extending substantially co-extensive with the ends of the work to be welded, and a holding section embracing and secured to the first mentioned section for conducting electric current to the work.

2. In welding apparatus, the combination of cooperating jaws engageable with opposite sides of the work and provided with corrugations substantially co-extensive with the portion of the work to be welded for penetrating the work, the corrugated surface on one of said jaws adapted to recede away from the work from its inner to its outer tooth whereby the teeth of the cooperating jaws nearest the weld will penetrate the work to a greater extent than the remaining teeth.

3. In a welding apparatus the combination of cooperating jaws engageable with opposite sides of the work, one of said jaws having a hardened corrugated portion for penetrating the work, and a substantially channel-shaped conductor embracing the hardened portion aforesaid with one leg thereof arranged flush with the corrugations and terminating adjacent thereto.

In testimony whereof I affix my signature.

WILLIAM FRICK.